UNITED STATES PATENT OFFICE.

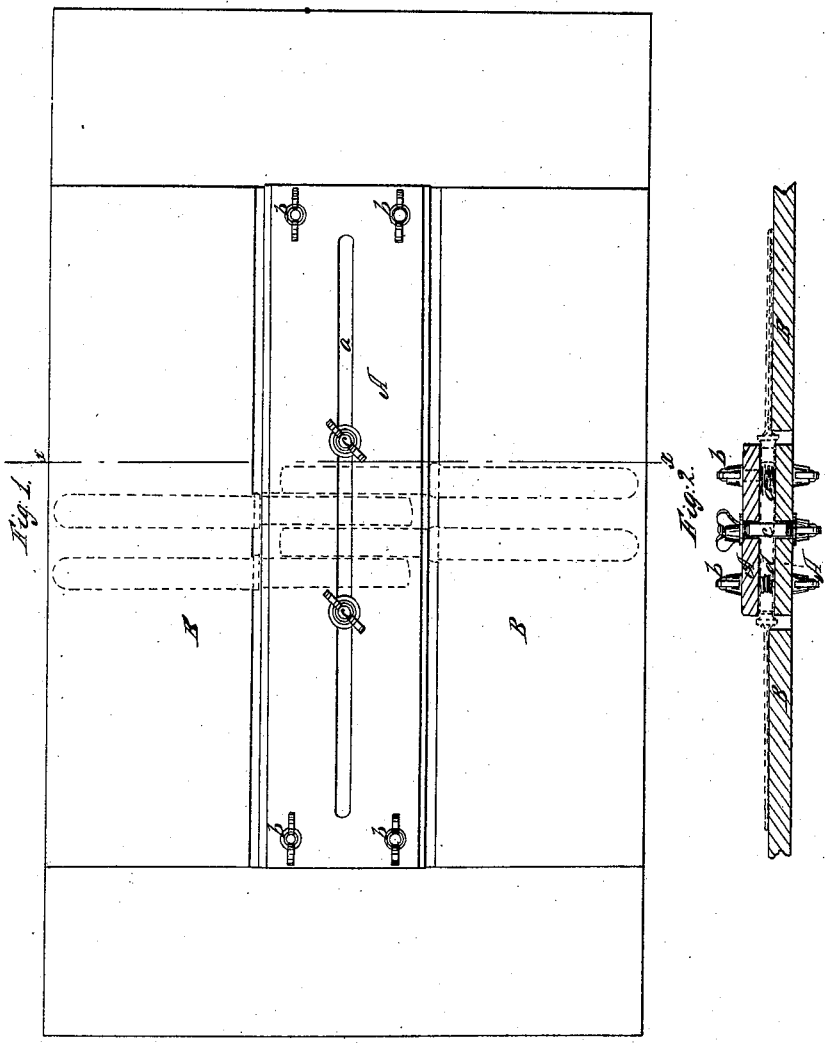

OLIVER SWEENEY, OF NORWICH, CONNECTICUT.

KNIFE-CLEANER.

Specification of Letters Patent No. 31,193, dated January 22, 1861.

*To all whom it may concern:*

Be it known that I, OLIVER SWEENEY, of Norwich, in the county of New London and State of Connecticut, have invented a new and Improved Device for Cleaning Knives, &c.; and I do hereby declare that the following is a full, clear, and exact description of the same, reference being had to the accompanying drawings, making a part of this specification, in which—

Figure 1, represents a plan or top view of my invention. Fig. 2, is a transverse vertical section of the same, the line $x, x$, Fig. 1, indicating the plane of section.

Similar letters of reference in both views indicate corresponding parts.

All the devices heretofore proposed for the purpose of facilitating the labor of cleaning knives etc.; have one main defect, viz; they do not facilitate that labor, because they are every one of them so arranged that each knife has to be taken up separately and exposed to the action of, or brought in contact with the working parts of the cleaner.

In order to render a knife cleaner practicable, it is necessary that it be so constructed, that the knives are held stationary with the plates resting on a firm support and that both hands can be employed simultaneously in rubbing the knives with the brushes for the purpose of cleaning them. Such is my knife cleaner which consists in a clamp to receive the handles of two or more knives with the blades sticking out in opposite directions in combination with a reversible board perforated to receive the clamp and forming the support for the blades of the knives fastened in said clamp in such a manner, that the blades resting on said board can be cleaned by the simultaneous action of both hands of the operator first with the wet brushes and afterward with the dry brushes as will be hereinafter more fully explained.

To enable those skilled in the art to make and use my invention I will proceed to describe it.

A, A, are two plain pieces of hardwood or other suitable material, provided with slots $a$, in their longitudinal centers and fitted together by means of guide pins $b$. The slots $a$, receive the clamping screws $c$, the middle portions of which are square so that they do not turn in the slots. By means of these screws the two plates A, A, are forced together and springs $d$, wound around the guide pins $b$, have the tendency to keep said plates apart.

Between the plates A, A, the knives are secured as clearly shown in red outlines in Fig. 1, the handles being placed close together with the blades sticking out alternately in opposite directions. The screws $c$, are now brought close up to the handles of the outer pair of knives and by screwing up the whole series of knives are securely fastened between the two plates A, A. Thus prepared the clamps A, A, with the knives are placed between two boards B, B, which are fastened together at such a distance apart, that the plates A, A, pass freely through between them and that the blades of the knives rest flat on their upper surfaces as clearly shown in red outlines in Fig. 2. After the knives have all been brought in this position, the operator takes two brushes one in each hand, and he can now clean the whole series of knives at one operation, and nearly with the same ease as he could one, if he had to hold it with one hand and rub it with the other. When the upper sides of the knives are cleaned, the clamp A, A, is reversed so as to bring the other sides of the knives up and to enable the operator to clean these in the same manner.

The boards B, B, are placed on a table or on any other suitable support and they are so arranged, that they can be reversed, so that one side is turned up, while the wet brushes are used and the other side while the dry brushes are used. By these means two dozen knives can be cleaned by one operation with the greatest ease, and the whole device is so simple, that it can be sold for a mere trifle, and all its parts are so constructed, that they are not liable to get out of repair.

Having thus described my invention, what I claim as new and desire to secure by Letters Patent, is;

A knife cleaner having in combination a clamp A, and a perforated reversible board B, constructed and operating in the manner and for the purpose described.

OLIVER SWEENEY.

Witnesses:
C. W. COUTAN,
M. M. LIVINGSTON.